US012754428B2

(12) United States Patent
Koppetz

(10) Patent No.: US 12,754,428 B2
(45) Date of Patent: Oct. 6, 2026

(54) DATA GLASSES FOR A MOTION PICTURE CAMERA

(71) Applicant: Arnold & Richter Cine Technik GmbH & Co. Betriebs KG, Munich (DE)

(72) Inventor: Michael Koppetz, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 230 days.

(21) Appl. No.: 18/665,901

(22) Filed: May 16, 2024

(65) Prior Publication Data

US 2024/0402494 A1 Dec. 5, 2024

(30) Foreign Application Priority Data

May 31, 2023 (DE) ......................... 102023114207.0

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G02B 27/0176* (2013.01);
(Continued)

(58) Field of Classification Search
CPC ............ G02B 27/0172; G02B 27/0093; G02B 27/0176; G02B 27/0179;
(Continued)

(56) References Cited

U.S. PATENT DOCUMENTS 4,404,595 A * 9/1983 Ushiro .................. H04N 23/67 348/E5.025
9,854,173 B2 12/2017 Faehrmann et al.
(Continued)

FOREIGN PATENT DOCUMENTS

CN 104809494 A 7/2015
DE 102013217223 A1 3/2015
(Continued)

OTHER PUBLICATIONS

German Patent and Trademark Office Communication issued in Application No. 10 2023 114 207.0, dated Feb. 14, 2024.
(Continued)

*Primary Examiner* — William R Alexander
(74) *Attorney, Agent, or Firm* — Amster, Rothstein & Ebenstein LLP

(57) ABSTRACT

Data glasses for a motion picture camera comprising a data input for receiving camera information that comprises status information of the motion picture camera, configuration information of the motion picture camera and/or recorded images of the motion picture camera; a display device that is configured to display a representation of the received camera information; and a control device that is configured to determine a position relationship that indicates a position and/or orientation of the data glasses relative to the motion picture camera, and to adjust a position of the representation of the received camera information at the display device based on the position relationship.

20 Claims, 7 Drawing Sheets

(51) Int. Cl.
*H04N 23/66* (2023.01)
*H04N 23/90* (2023.01)

(52) U.S. Cl.
CPC ......... *G02B 27/0179* (2013.01); *H04N 23/66* (2023.01); *H04N 23/90* (2023.01); *G02B 2027/0138* (2013.01); *G02B 2027/014* (2013.01); *G02B 2027/0178* (2013.01); *G02B 2027/0187* (2013.01)

(58) Field of Classification Search
CPC ...... G02B 2027/0138; G02B 2027/014; G02B 2027/0178; G02B 2027/0187; H04N 23/66; H04N 23/90; H04N 23/632; H04N 23/633; H04N 23/60; H04N 23/50; H04N 13/332
USPC .......................................................... 359/630
See application file for complete search history.

(56) References Cited

U.S. PATENT DOCUMENTS

| | | | | |
|---|---|---|---|---|
| 2016/0205355 | A1* | 7/2016 | Warzelhan | G06T 7/60 348/158 |
| 2018/0158246 | A1* | 6/2018 | Grau | G06T 3/18 |
| 2021/0325679 | A1* | 10/2021 | Layne | G02B 27/0172 |
| 2022/0165189 | A1* | 5/2022 | Lee | G02B 7/02 |
| 2023/0296885 | A1* | 9/2023 | Bamberger | G02B 27/01 348/207.11 |
| 2023/0326142 | A1* | 10/2023 | Cordes | G06T 19/003 345/426 |

FOREIGN PATENT DOCUMENTS

| | | | |
|---|---|---|---|
| DE | 102014105011 | A1 | 10/2015 |
| EP | 3496387 | A1 | 6/2019 |
| JP | 2009010728 | A | 1/2009 |
| JP | 2022105044 | A | 7/2022 |

OTHER PUBLICATIONS

European Patent Office Communication issued in Application No. 24173752.7, dated Sep. 20, 2024.

* cited by examiner

DATA GLASSES FOR A MOTION PICTURE CAMERA

FIELD OF THE INVENTION

The invention relates to data glasses for a motion picture camera, to a motion picture camera system, and to a method of displaying camera information.

BACKGROUND

Motion picture cameras serve to record a motion picture sequence, i.e. a sequence of images, by means of an electronic image sensor and to store or output this motion picture sequence. Conventional electronic motion picture cameras are often equipped with one or more display units that enable a camera operator to view recorded images and/or additionally displayed information. Some of these display units are also equipped with control elements and form part of the user interface of the motion picture camera.

A distinction is made between display units that may be viewed from a distance and are referred to below as "displays" and those that are equipped with an optics close to the eye, which is usually magnifying, and are referred to below as "viewfinders".

Displays are often integrated directly into the camera housing, wherein stand-alone units are also known that may be fastened to the motion picture camera via suitable holding apparatus. A motion picture camera often has a plurality of displays that each reproduce their own information content.

Viewfinders, on the other hand, are usually used to align and readjust the motion picture camera. In a conventional design, the viewfinder is fixedly connected to the motion picture camera and offers a viewing direction that extends substantially in parallel with the recording direction of the motion picture camera. Furthermore, viewfinders are often equipped with a so-called eyecup that forms a light-tight seal to the eye socket of the user and prevents the entry of extraneous light. Such designs have the additional effect of giving the user a fixed geometric relationship to the motion picture camera. The impression thus arises that the lens of the motion picture camera is an extension of one's own eye, which facilitates the alignment and guidance of the motion picture camera.

However, the display units mentioned here have the disadvantage that they are usually rigid with respect to the display content. Either a display unit only displays a specific content so that a plurality of display units are required to display the multitude of image and status data of the motion picture camera, or the operator of the motion picture camera has to switch between different display forms of the display unit. Furthermore, due to the limited space at the display units or at the motion picture camera, compromises often have to be made, for example with regard to the amount of content displayed.

Physical display units also take up space at the camera body and thus influence the design of the camera. The size required for a good view of the display is often at odds with a good handling capability of the camera. It must also be considered that different positions and orientations of the display units may be required for different applications. This circumstance is often taken into account by complex, articulated holding apparatus, which leads to increased costs and an increased complexity in the manufacture of such motion picture cameras.

It is an underlying object of the invention to provide data glasses for a motion picture camera, a corresponding motion picture camera system, and a corresponding method that facilitate the display of camera information.

This object is satisfied by data glasses, a motion picture camera system and a method according to the independent claims.

SUMMARY OF INVENTION

The invention relates to data glasses for at least one motion picture camera (in the following also referred to as a pair of data glasses), said data glasses comprising:

- a data input for receiving camera information that comprises status information of the motion picture camera, configuration information of the motion picture camera and/or recorded images of the motion picture camera;
- a display device that is configured to display a representation of the received camera information; and
- a control device that is configured to determine a position relationship that indicates a position and/or orientation of the data glasses relative to the motion picture camera, and to adjust a position of the representation of the received camera information at the display device based on the position relationship.

In other words, the position of the representation of the received camera information at the display device—and thus the perception of the representation by the user of the data glasses—is determined based on the viewing angle of the user of the data glasses and/or the position of the data glasses relative to the motion picture camera and/or the head position of the user relative to the motion picture camera. A respective position of the data glasses (in particular a position in space) relative to the motion picture camera and/or an orientation of the data glasses (in particular an angular position in space) relative to the motion picture camera may thus correspond to a respective position relationship, and the data glasses may display the representation of the received camera information at a position at the display device that is calculated for this position relationship.

The invention thus enables a display of the representation of the received camera information in a predetermined spatial relationship to the motion picture camera. The data glasses may, for example, generate a virtual display that appears to be connected to the motion picture camera in a fixed position from the viewpoint of the user of the data glasses. The representation of the camera information at the display device may be displayed as if said representation were arranged in a fixed position in space in relation to the motion picture camera (at the motion picture camera or remote from the motion picture camera), wherein, during a head movement of the user, i.e. during a change in the position and/or orientation of the data glasses, the viewing angle of the user of the data glasses on the corresponding representation appears to change.

The display of camera information by means of data glasses has the advantage that the displayed representation of the camera information, in particular the size, shape and/or position of the representation, may be flexibly adapted to the respective viewing perspective of the user of the data glasses. Furthermore, by using data glasses or by using virtual displays instead of physical displays at the motion picture camera, substantially the entire field of view of the user of the data glasses may be used as a potential display surface. At the same time, there is no need to attach costly physical displays to the motion picture camera. Since the displays of the data glasses are only virtual displays, moreover, the adaptation of the display to preferences of the user is also facilitated. For example, the user of the data glasses may set in advance which camera information is to be displayed using the data glasses and which camera information is to be hidden. In other words, the content of the displayed representation of the camera information may also be flexibly adapted. The camera information may in particular be numerical or textual data.

In some embodiments, the display device may be transparent, in particular partly or completely transparent in regions, such that a real environment of the data glasses may be perceived through the display device. In some embodiments, the motion picture camera may be visible through the data glasses. For example, in such a case, the representation of the camera information may be displayed as an overlay on the camera housing of the motion picture camera, or in a region of the display device in whose extension the motion picture camera is not currently arranged, or partly as an overlay on the camera housing and partly offset from the optical image of the motion picture camera through the display device.

The determination of the position relationship may comprise the control device receiving the position relationship as a directly usable value, in particular via the data input of the data glasses. Alternatively thereto, the determination of the position relationship may comprise the control device calculating the position relationship partly or completely, in particular from signals of a sensor of the data glasses and/or a sensor of the motion picture camera or a separate apparatus. Furthermore, the position relationship may be continuously updated to detect a changing position and/or orientation of the data glasses (i.e. a movement of the data glasses) relative to the motion picture camera. For example, the received or calculated value of the position relationship may be received or calculated at regular intervals.

The control device of the data glasses may, for example, comprise one or more of the following devices: an integrated circuit (IC); a microprocessor; a central processing unit (CPU); an application-specific integrated circuit (ASIC); or a field programmable gate array (FPGA).

Furthermore, the display device may, for example, comprise one or more of the following devices: a display, in particular a liquid crystal display, eyeglasses, in particular smart glasses, a projector or a glass prism. The display device may be configured and arranged for a representation of the received camera information for a visual perception with at least one eye of the user of the data glasses. For this purpose, at least a part of the display device may be arranged in the field of view of the user, for example corresponding to the usual arrangement of an eyeglass lens in front of a respective eye of the user.

The data glasses may have a holding device for fastening the data glasses to the head of a user, for example a flexible holding strap and/or a glasses frame.

Further embodiments can be seen from the description, from the dependent claims, and from the drawings.

In some embodiments, the data glasses comprise at least one camera detection sensor that is configured to detect the position and/or orientation of the data glasses relative to the motion picture camera, wherein the control device is configured to determine the position relationship based on signals of the camera detection sensor. For example, the control device may determine the position relationship by direct use or by evaluating the signals of the camera detection sensor. The control device may, for example based on the signals of the camera detection sensor, generate a three-dimensional model in which virtual data glasses and/or a virtual motion picture camera is simulated based on the acquired signals of the camera detection sensor, wherein the position relationship between the actual data glasses and the actual motion picture camera may be determined based on the position relationship between the virtual data glasses and the virtual motion picture camera, i.e. the position and/or orientation of the virtual data glasses relative to the position and/or orientation of the virtual motion picture camera. In this respect, the position of the camera detection sensor at the data glasses may in particular be known or predefined so that the position of the camera detection sensor may be used as the point of origin for creating a spatial model. Furthermore, the position relationship may be determined using known triangulation or tracking methods and algorithms or other suitable methods.

In some embodiments, the camera detection sensor has an auxiliary camera that is configured to detect at least one marking at the camera housing of the motion picture camera. The marking may in particular be an optical marking. For example, the optical marking may comprise a QR code, another data code or any recognizable pattern that may be easily and unambiguously recognized by means of the camera detection sensor. The marking may define not only a position in space, but also an angular position, for example by a non-rotationally symmetrical pattern. The marking may furthermore be associated with a predefined position and/or orientation on the camera housing. The predefined position and/or orientation may, for example, be known to the control device or received by the control device. The control device may, for example in response to the detection of a marking, receive identification information, in particular with respect to the predefined position and/or orientation of the marking at the motion picture camera or the camera housing, a camera model or other suitable aspects of the motion picture camera. The identification information may in particular be embedded in the marking itself. The control device may be configured to read out or decode the identification information embedded in the marking. Based on the predefined position and/or orientation of the marking, the control device may determine the position relationship between the data glasses and the motion picture camera. Alternatively, the control device may determine the position relationship without information about the predefined position and/or orientation of the marking. For example, the control device may determine the position relationship solely based on the signals of the camera detection sensor.

There may in particular be a plurality of markings, for example two, three or four markings at the camera housing to increase the accuracy of the determination of the position relationship. For example, the position relationship may be determined using the plurality of markings by means of triangulation methods.

In addition, the data glasses may, for example, have a static and/or dynamic acceleration sensor to determine the orientation of the data glasses in space relative to the direction of gravity. The acceleration sensor may, for example, comprise piezoresistive, piezoelectric and/or capacitive acceleration sensors. The data glasses may further comprise a gyroscope and/or a magnetometer, wherein the gyroscope and/or magnetometer are used together with the acceleration sensor to determine the orientation of the data glasses.

Alternatively or in addition to said camera detection sensor, a glasses detection sensor, e.g. an auxiliary camera, for determining the position and/or orientation of the data glasses relative to the motion picture camera may be provided at the motion picture camera or at a separate position. In such a case, at least one marking may further be provided at the data glasses, wherein the glasses detection sensor may detect the at least one marking to determine the position relationship between the data glasses and the motion picture camera. The above statements on the camera detection sensor and the markings at the motion picture camera also apply accordingly to the glasses detection sensor and the markings at the data glasses (e.g. designed as optical markings).

In some embodiments, at least in an overlay mode of the data glasses, the display device is transparent such that a real environment of the data glasses may be perceived through the display device at least adjacent to the representation of the received camera information, wherein the control device is configured to adjust the position of the representation of the received camera information at the display device such that the representation appears to be superposed on a camera housing of the motion picture camera. For this purpose, the display device may be partly or completely transparent in the respective region. In some embodiments, the representation of the received camera information may appear superposed on a predetermined projection surface of the camera housing. For example, the representation of the received camera information may appear on a predetermined surface, i.e. the projection surface, of the camera housing. The projection surface may preferably be designed as planar and/or in a uniform color tone so that the recognition of the projection surface by the data glasses and in particular by the camera detection sensor of the data glasses is facilitated. The representation of the superposed data thus appears to the user like a projection on the corresponding surface of the camera housing. In this regard, the projection surface mentioned in connection with the invention does not mean that an optical projection takes place onto this surface, but the term is to be understood as a virtual projection. The projection surface of the camera housing may also be referred to as a virtual projection surface or as a displaying surface.

In some embodiments, the representation of the received camera information may appear superposed on the camera housing of the motion picture camera, at least as long as the motion picture camera is in the field of view of the data glasses. For example, the camera information may be displayed at positions at the camera housing of the motion picture camera that are familiar or to be expected for the user of the motion picture camera. The familiar positions are, for example, positions at which corresponding camera information is regularly provided in conventional motion picture cameras.

Additionally or alternatively, the representation of the received camera information at the display device may take place in a region in which the motion picture camera is not visible through the display device. This region at the display device is referred to below as the camera-free region.

The representation of the camera information may further be displayed as if it were associated with a fixed position in space. For example, the user of the data glasses may associate the representation of the camera information with a fixed position in space by means of a user input.

Furthermore, the representation of the camera information in the camera-free region may be arranged in a fixed position with respect to the position of the camera housing of the motion picture camera, in particular with respect to a reference point, e.g. the marking, at the camera housing. For example, the representation may comprise a virtual display unit that appears to be connected in a fixed position to the camera.

In some embodiments, the display device may be selectively switched between a regionally transparent state, in which a real environment of the data glasses may be perceived through the display device, and a regionally opaque state. At least in an overlap mode of the data glasses, the control device may be configured to switch the display device at least partly opaque in a region that corresponds to the position of the representation of the received camera information and to switch the display device transparent in other regions. For example, the display device may have a light permeability with a value in the range from 0% to 30%, for example a value of 0%, 10%, 20% or 30%, in a region that corresponds to the position of the representation of the received camera information. Furthermore, individual representations of camera information, e.g. general status information of the camera, may be displayed partly opaque at the display device, whereas other representations, e.g. configuration settings and/or recorded images of the motion picture camera, are displayed completely opaque. This allows the user's attention to be focused on information relevant to a specific situation or recording.

In some embodiments, the data glasses are configured to selectively assume an observation mode that may correspond to said overlay mode or said overlap mode of the data glasses. In the observation mode, the display device is at least partly transparent such that a real environment of the data glasses may be perceived through the display device, wherein the control device controls the display device to display a representation of status information and/or configuration information of the motion picture camera as the received camera information. Furthermore, the data glasses may be configured to selectively assume a viewfinder mode in which the control device controls the display device to display a representation of recorded images of the motion picture camera as the received camera information, in particular against an opaque background, in particular in real time.

In the observation mode, the user is able to observe or perceive the environment through the data glasses, while the representation of status information and/or configuration information of the motion picture camera is displayed to the user at the display device as if it were part of the environment. In the viewfinder mode, however, the recorded image of the motion picture camera is displayed to the user. In particular, in the viewfinder mode, only the recorded image of the motion picture camera is displayed at the display device. In the viewfinder mode, a viewfinder function of a conventional motion picture camera is thus emulated in which a viewfinder is fastened to the camera housing. The data glasses may generally also operate in a combination of the two operating modes in which, for example, both the recorded image of the motion picture camera and status and/or configuration information are displayed to the user at the display device.

In some embodiments, the control device is configured to assume the viewfinder mode based on a signal of a viewfinder mode selection switch or a viewfinder mode selection sensor. The viewfinder mode selection sensor may be configured to detect a contact between the data glasses and the motion picture camera and/or an approach of the data glasses to the motion picture camera into a predetermined minimum distance (i.e. an approach that corresponds to the predetermined minimum distance or a smaller distance). The signal of the viewfinder mode selection switch may, for example, be generated by manually actuating the viewfinder mode selection switch. The signal of the viewfinder mode selection sensor may, for example, be generated by a contact between the data glasses and the motion picture camera and/or an approach of the data glasses to the motion picture camera into a predetermined minimum distance. The signal of the viewfinder mode selection sensor may in particular be transmitted to the control device that may automatically switch the data glasses to the viewfinder mode based on the signal.

The viewfinder mode selection switch may e.g. be a button, a slide switch, a softkey or a virtual switch of a display. The viewfinder mode selection sensor may correspond to one of the sensors already mentioned, e.g. the camera detection sensor or the glasses detection sensor, or may comprise other sensors (e.g. an optical or capacitive proximity sensor). A contact between the data glasses and the motion picture camera and/or an approach of the data glasses to the motion picture camera into a predetermined minimum distance may generally also be determined based on a plurality of sensors, in particular the sensors mentioned herein. The viewfinder mode selection switch and/or viewfinder mode selection sensor may further be arranged at the data glasses and/or at the motion picture camera.

The sensors mentioned herein may each e.g. comprise an optical sensor, in particular a camera, a radio sensor, an induction sensor, an ultrasonic sensor, a magnetic sensor or a capacitive sensor.

In the viewfinder mode, the data glasses may be used as a binocular or monocular viewfinder. In the case of a monocular viewfinder, the representation of the recorded images of the motion picture camera is, for example, only shown to one eye of the user of the data glasses, whereas, in the case of a binocular viewfinder, the representation of the recorded images is shown to both eyes of the user of the data glasses. In the case of the monocular viewfinder, the view of the environment may be selectively masked. This may e.g. take place via the display device by switching the display device to an opaque state, in particular a completely opaque state. For example, the recorded image is displayed to one eye of the user of the data glasses, while an amount of light of the light incident on the other eye is minimized due to the light permeability of the display device. Alternatively, a fold-in opaque diaphragm may be provided at the data glasses that prevents a view of the environment in the folded-in state. Alternatively, an opaque diaphragm may be fixedly attached to the motion picture camera so that one eye of the user is covered when the positions his head or the data glasses for switching on the viewfinder mode in a position at the diaphragm required for this purpose. The viewfinder mode thus enables the user to establish the usual physical and geometric relationship to the camera which the user needs to align and guide the camera in the usual manner. At the same time, the user has the flexibility to be able to view the viewfinder image at some distance from the camera as required.

In some embodiments, the display device comprises a first display layer and a second display layer, wherein the first display layer is configured to display the representation of the received camera information, and wherein the second display layer may at least regionally be switched between a transparent state and an opaque state. The second display layer may in particular be arranged behind the first display layer along the direction of observation. The first display layer and the second display layer may generally be transparent (i.e. in a respective basic state). The second display layer may be adapted to the contents represented in the first display layer. For example, the second display layer may switch to an opaque state in regions that are superposed on the representation of the camera information on the first display layer and to a transparent state in the remaining regions. In the viewfinder mode, the second display layer may for, example, be operated in an substantially completely opaque state, with the first display layer displaying the recorded image of the motion picture camera.

In some embodiments, the display device comprises a display layer, in particular said first display layer, and a partly transmitting mirror that is configured to reflect a representation of the received camera information, said representation being displayed by the display layer, into the field of view of a user of the data glasses.

In some embodiments, the display device may further comprise a projector and/or an optics, e.g. a waveguide, that is configured to project the representation of the displayed information directly onto the retina of the eye of the user.

In some embodiments, the control device may be configured to adapt the representation of the received camera information at the display device, in particular the size of the representation and/or a camera information type, based on a distance between the data glasses and the motion picture camera. The camera information types, for example, comprise the already mentioned status information, configuration information and/or recorded images of the motion picture camera. However, subgroups of the aforementioned camera information types may also be understood as a separate camera information type. For example, the configuration information may be divided into different subgroups of configuration information that are of different relevance for different user groups. A respective user group may thus be displayed camera configuration information corresponding to the user group. The distance between the data glasses and the motion picture camera may, for example, be determined by means of one of the aforementioned sensors or by means of a distance sensor provided for this purpose.

The representation of the camera information may, for example, be displayed larger in relation to the motion picture camera for users who have a greater distance from the motion picture camera than for users who have a smaller distance from the motion picture camera. In particular, the data glasses may be configured to display to the user, based on a determination that the distance between the data glasses and the motion picture camera is within a predefined distance range, a type of camera information associated with the predefined distance range. For example, a plurality of distance ranges may be defined with which a respective, in particular different, type of camera information is associated.

In some embodiments, the control device may be configured to further adjust the position of the representation of the received camera information at the display device based on a user input. For example, the data glasses may have an input device or receive a user command via the data input. Additionally or alternatively, the motion picture camera may also comprise a corresponding input device. The position of the representation of the camera information at the display device may be modified based on the user input, for example so that the user may arrange the representation relative to the motion picture camera visible through the data glasses at a position at which the representation does not interfere with a respective application.

The control device may be configured for a gesture control. In some embodiments, the user may set the position of the representation by means of hand, finger and/or head movements as user inputs that are detected by sensors, e.g. the camera detection sensor, the glasses detection sensor, the acceleration sensor and/or other sensors, wherein the control device is configured to adjust the position of the representation of the camera information at the display device based on the detected hand, finger and/or head movements. Furthermore, at least one of the following actions may be performed by means of the input device and/or the hand, finger and/or head movement: Setting a size of the representation, setting a shape of the representation, setting a type of camera information or removing the representation of the camera information.

In some embodiments, the data glasses further comprise an eye position sensor for determining a position of an eyeball of the user of the data glasses, wherein the control device is configured to adjust the position of the representation of the received camera information at the display device based on the determined position of the eyeball. The viewing direction and/or position of the eye relative to the position of the data glasses may in particular be detected. It may hereby be ensured that the position of the representation of camera information at the display device corresponds to the intended position. In other words, the representation of the camera information is prevented from being displayed in an unintended position to the user of the data glasses due to an uncommon or unusual position of the data glasses relative to the eye, for example due to an unusual positioning of the data glasses on the nose of the user.

In some embodiments, the data input of the data glasses may comprise a connector for a cable connection and/or a radio interface for a wireless connection to the motion picture camera.

A further aspect of the invention relates to a motion picture camera system comprising: at least one motion picture camera having a camera body that has a camera housing, a lens mount for connecting an interchangeable lens and an electronic image sensor; and at least one pair of data glasses according to any one of the preceding embodiments.

The data glasses are connected to the motion picture camera via the data input. The motion picture camera may comprise a data output associated with the data input of the data glasses. A bidirectional communication is generally possible. As described above, the data transmission between the data glasses and the motion picture camera may take place in a wired manner, e.g. via USB, HDMI or Ethernet, or wirelessly, e.g. via Wi-Fi, Bluetooth, infrared, WLAN or ZigBee.

In some embodiments, the motion picture camera system comprises a plurality of motion picture cameras, wherein the data glasses are configured to display a representation of the camera information received from the respective motion picture camera at the display device for each motion picture camera. For example, the motion picture cameras may comprise respective markings by means of which the data glasses may identify the plurality of motion picture cameras in the field of view of the user. The data glasses may further be configured to display associated, camera-specific representations at the display device based on the identification of a respective motion picture camera. The camera-specific representations in this respect correspond to the representations of the camera information received from a respective motion picture camera.

For example, a first and a second motion picture camera may be located in the field of view of the user of the data glasses, wherein the control device of the data glasses may be configured to recognize, based on the markings at the first and second motion picture camera, that two motion picture cameras are located in the field of view of the user, and to display the recorded images, i.e. the camera image, of the respective motion picture camera in a predetermined spatial relationship to the corresponding motion picture camera at the display device based on the marking, in particular the identification information, of the respective motion picture camera. The user of the data glasses is thus shown the camera image of both motion picture cameras, in particular simultaneously, at the display device. Accordingly, a respective representation of the camera information received from a plurality of motion picture cameras may also be selectively, in particular not simultaneously, displayed to the user of the data glasses if these motion picture cameras alternately enter the field of view of the data glasses. The camera-specific representations are in this respect not limited to the respective camera image of the corresponding motion picture camera. Rather, all types of suitable camera-specific representations may be displayed at the display device.

In some embodiments, the motion picture camera system comprises a plurality of data glasses, wherein the plurality of data glasses are configured to display different representations of the received camera information at the respective display device based on a respective preset data glasses configuration. Each pair of data glasses may, for example, be configured in accordance with a specific user group. Alternatively, each pair of data glasses may be configured to automatically adapt the respective data glasses configuration, for example based on a determined distance of the respective data glasses from the motion picture camera. The distance of a respective data glasses from the motion picture camera may be determined according to the above statements.

In some embodiments, the motion picture camera system further comprises a remote control unit for a remote control of the motion picture camera, wherein the control device of the data glasses is configured to selectively determine a further position relationship that indicates a position and/or orientation of the data glasses relative to the remote control unit, and to adjust the position of the representation of the received camera information at the display device based on the further position relationship.

For this purpose, the remote control unit may have at least some of the same features as the motion picture camera so that the data glasses may interact with the remote control unit in the same way as with the motion picture camera in the above embodiments.

In some embodiments, the remote control unit may further be configured to transmit remote control signals to the motion picture camera, e.g. for a start or an end of a recording, for changing recording parameters, such as an exposure time, a focus value, an iris diaphragm value and/or the focal length of the lens of the motion picture camera and/or for changing a spatial orientation of the motion picture camera when using a drive device. The remote control unit may in particular have a housing shape corresponding to the camera housing.

In some embodiments, the remote control unit may comprise at least one sensor for detecting movements, in particular tilting and panning movements, wherein corresponding remote control signals are generated and transmitted to the motion picture camera or a drive device at which the motion picture camera is mounted. Thus, the orientation of the motion picture camera may be controlled by means of the drive device by moving the remote control unit. At the same time, in the viewfinder mode, the user may view the images recorded by the motion picture camera through the data glasses and may hereby monitor the movement of the motion picture camera. Using data glasses in conjunction with a remote control unit offers the advantage that the camera may be operated as if it were near the user, but without having to duplicate its displays as part of the remote control unit.

In some embodiments, the motion picture camera, as already mentioned, has a glasses detection sensor that is configured to detect the position and/or orientation of the data glasses relative to the motion picture camera. The control device of the data glasses may be configured to determine the position relationship based on signals of the glasses detection sensor, in particular by direct use or by evaluating the signals of the glasses detection sensor. For this purpose, the signals of the glasses detection sensor may be transmitted to the data input of the data glasses, for example via the data output of the motion picture camera. Furthermore, the glasses detection sensor may e.g. comprise an auxiliary camera. In some embodiments, the data glasses may have one or more optical markings that are detected by the glasses detection sensor to determine the position and/or orientation of the data glasses relative to the motion picture camera. The above statements on the camera detection sensor and the markings at the motion picture camera apply accordingly here.

In some embodiments, the camera housing of the motion picture camera may have at least one (virtual) projection surface, as already explained above in connection with the data glasses. The control device of the data glasses may be configured to adjust the position of the representation of the received camera information at the display device such that the representation of the projection surface of the camera housing appears superposed. The representation of the received camera information may appear superposed on the projection surface of the camera housing, at least as long as the motion picture camera is in the field of view of the data glasses. For example, the representation of the camera information may be displayed at positions at the camera housing of the motion picture camera that are familiar to or to be expected for the user of the motion picture camera. These familiar positions are, for example, positions at which the camera information can regularly be found in conventional motion picture cameras. The projection surface may further be provided on a fold-out extension part of the camera housing. For example, the representation of the camera information may be projected onto the projection surface or superposed on the projection surface in a folded-out state of the fold-out extension part. The user of the data glasses is thus given the impression as if the representation of the camera information were actually displayed on the projection surface, for example as on a real display.

One advantage of this form of the representation is that the surface of the projection surface may be designed such that the camera information represented by the data glasses is particularly easy to recognize, e.g. by using a surface that offers a high contrast to the representation of the camera information. Thus, the glasses may e.g. also be operated in a semi-transparent mode without the recognizability of the representation being impaired by the visible background.

A further aspect of the invention relates to a method of displaying camera information, which comprises status information, configuration information and/or recorded images of at least one motion picture camera, by means of at least one pair of data glasses, comprising the steps:

- determining a position relationship that indicates a position and/or orientation of the data glasses relative to the motion picture camera; and
- displaying a representation of the camera information at a display device of the data glasses based on the determined position relationship.

The position relationship may, for example, be determined based on sensor signals, as described above. In some embodiments, the determination of the position relationship further comprises calculating the position relationship based on a time-of-flight method and/or an FMCW method. Furthermore, the determination of the position relationship and/or the display of the representation, in particular the determination of the position of the representation at the display device, may take place based on a machine learning model, in particular a neural network, that has, for example, been pre-trained with suitable data, e.g. with collected position relationship data from test users of data glasses. Alternatively, the display of the representation of the camera information at the display device and in particular the determination of the position of the representation of the camera information at the display device may take place based on a look-up table. For each position and/or orientation of the data glasses and/or motion picture camera, the look-up table may, for example, include a position of the representation of the camera information at the display device that corresponds to this position and/or orientation.

The statements regarding the data glasses apply accordingly to the motion picture camera system and the method; this in particular applies with respect to advantages and embodiments.

If not otherwise stated, any combination of the preceding embodiments is possible in principle.

DESCRIPTION OF DRAWINGS

The invention will be presented purely by way of example with reference to the drawings in the following. There are shown.

DETAILED DESCRIPTION

Figure 1:
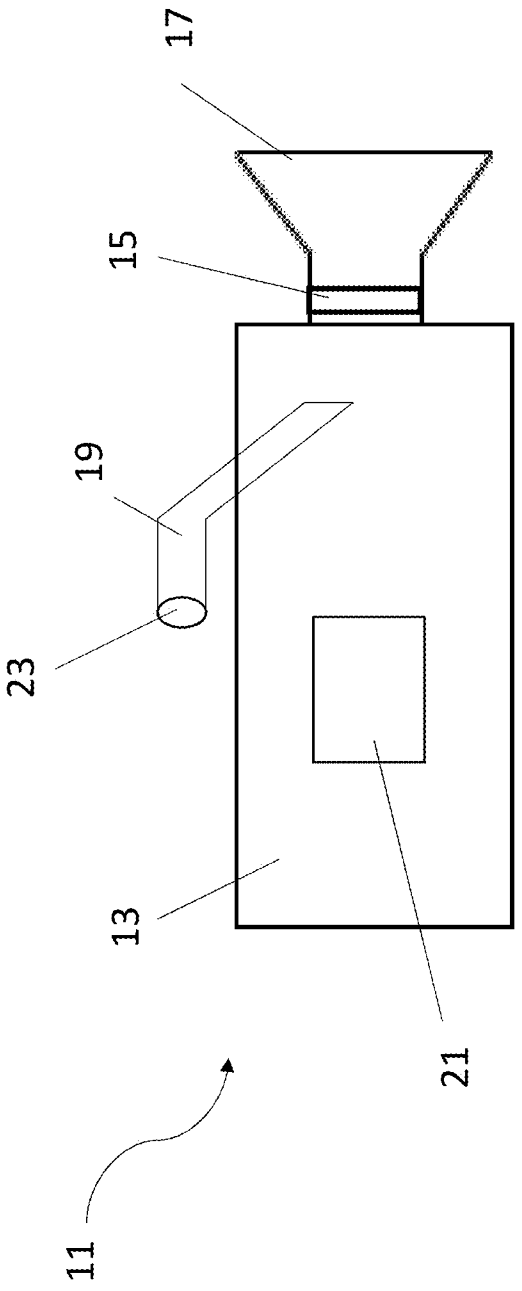
FIG. 1 a side view of a motion picture camera according to the prior art.

FIG. 1 shows a side view of a motion picture camera 11 such as is known from the prior art. The motion picture camera 11 comprises a camera housing 13, a lens mount 15 for connecting an interchangeable lens 17, a viewfinder 19 fastened to the camera housing and a display 21 fastened to the camera housing 13. A user of the motion picture camera 11 has the option of tracking the image 43 recorded by the motion picture camera 11 in real time via the viewfinder 19 or the display 21. If the user wishes to track the recorded image 43 of the motion picture camera 11 via the viewfinder 19, the positions one eye on an eyecup 23 of the viewfinder 19 so that he may view the recorded image 43 of the motion picture camera 11 via the corresponding eye. Alternatively, the user may view the recorded image 43 and/or further camera information, such as status information of the motion picture camera and/or configuration information of the motion picture camera, on the display 21.

Figure 2:
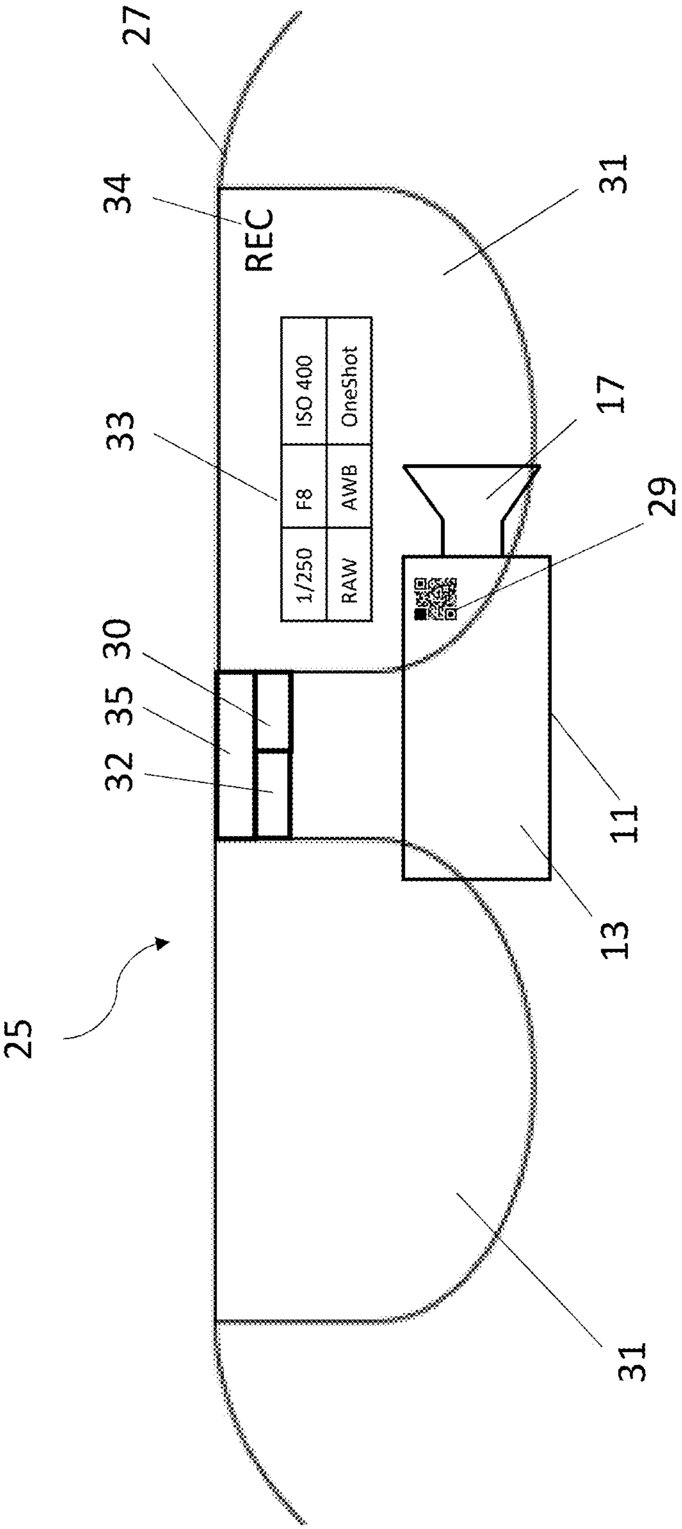
FIG. 2 a first embodiment of a motion picture camera system comprising data glasses.

FIG. 2 shows a first embodiment of a motion picture camera system 25 comprising data glasses 27 and a motion picture camera 11 (separate therefrom), wherein a side view of the motion picture camera 11 may be seen through the data glasses 27. In FIG. 2, the data glasses are operated in an observation mode in which the display device 31 is at least partly transparent so that a real environment of the data glasses, including the motion picture camera 11, may be perceived through the display device 31. The display device 31 may be controlled in terms of its light permeability and in terms of a reproduction of information. The display device 31 may, for example, comprise two eyeglasses, in particular so-called intelligent glasses (smart glasses), for the two eyes of the user.

An optical marking in the form of a QR code 29 is arranged at the camera housing 13 of the motion picture camera 11. As shown in FIG. 2, in response to a recognition of the QR code 29 on the camera housing 13, the data glasses 27 display camera configuration information 33, such as a shutter speed, a diaphragm aperture, an ISO sensitivity, a file format, white balance information and a recording type, to a user 45 of the data glasses 27 at a display device 31, in particular as numerical and/or textual information. The data glasses 27 comprise a control device 30 that receives the camera configuration information 33 from the motion picture camera 11 by radio via a data input 32 and controls the display device 31 accordingly. The configuration information 33 is only displayed at the display device 31 if the QR code 29 is in the field of view of the user 45 of the data glasses 27. Furthermore, the camera configuration information 33 is displayed in a region at the display device 31 in which the image of the motion picture camera 11 (as perceived by the user of the data glasses 27) is not arranged. A camera detection sensor 35 that is, for example, arranged in the bridge of the glasses in this respect detects the QR code 29, and in particular the position of the QR code 29 on the camera housing 13, and transmits corresponding signals to the control device 30.

Based on the detected position of the QR code 29 on the camera housing 13, the control device 30 determines a position relationship that indicates the position and orientation of the data glasses 27 relative to the position and orientation of the motion picture camera 11 in order to thereby identify the head position and viewing direction of the user relative to the motion picture camera 11. Based on this position relationship, the control device 30, by controlling the display device 31 accordingly, arranges the representation of the camera configuration information 33 in a region on the display device 31 in which the image of the motion picture camera 11 is not arranged, wherein the representation of the camera configuration information 33 is, however, arranged in a predetermined spatial relationship to the motion picture camera 11. For example, in the embodiment example according to FIG. 2, the representation of the camera configuration information 33 appears obliquely above the motion picture camera 11. This spatial relationship is maintained at the display device 31 in the perception by the user, even if the user changes his head position and/or viewing direction. Thus, if the image of the motion picture camera 11 moves along the display device 31 due to a change in the head position and/or viewing direction, the control device 30 ensures that the representation of the camera configuration information 33 is also followed accordingly in order to maintain the predetermined spatial relationship to the motion picture camera 11.

The motion picture camera system 25 may generally also be configured such that the representation of the camera configuration information 33 is displayed in a region of the display device 31 in which the motion picture camera 11 can be seen, for example as an overlay of a predetermined projection surface of the camera housing 13. Furthermore, the data glasses 27 may display a representation of status information 34 of the motion picture camera 11 in an upper right corner at the display device 31, here for example that the motion picture camera 11 is currently in a recording mode ("REC"). The data glasses 27 may generally display any suitable camera configuration information 33 and/or status information 34 of the motion picture camera 11 at the display device 31.

The data glasses 27 may further have an eye position sensor (as already explained) and/or an electrical energy source (e.g. a battery, accumulator, capacitor) (not shown in FIG. 2).

Figure 3:
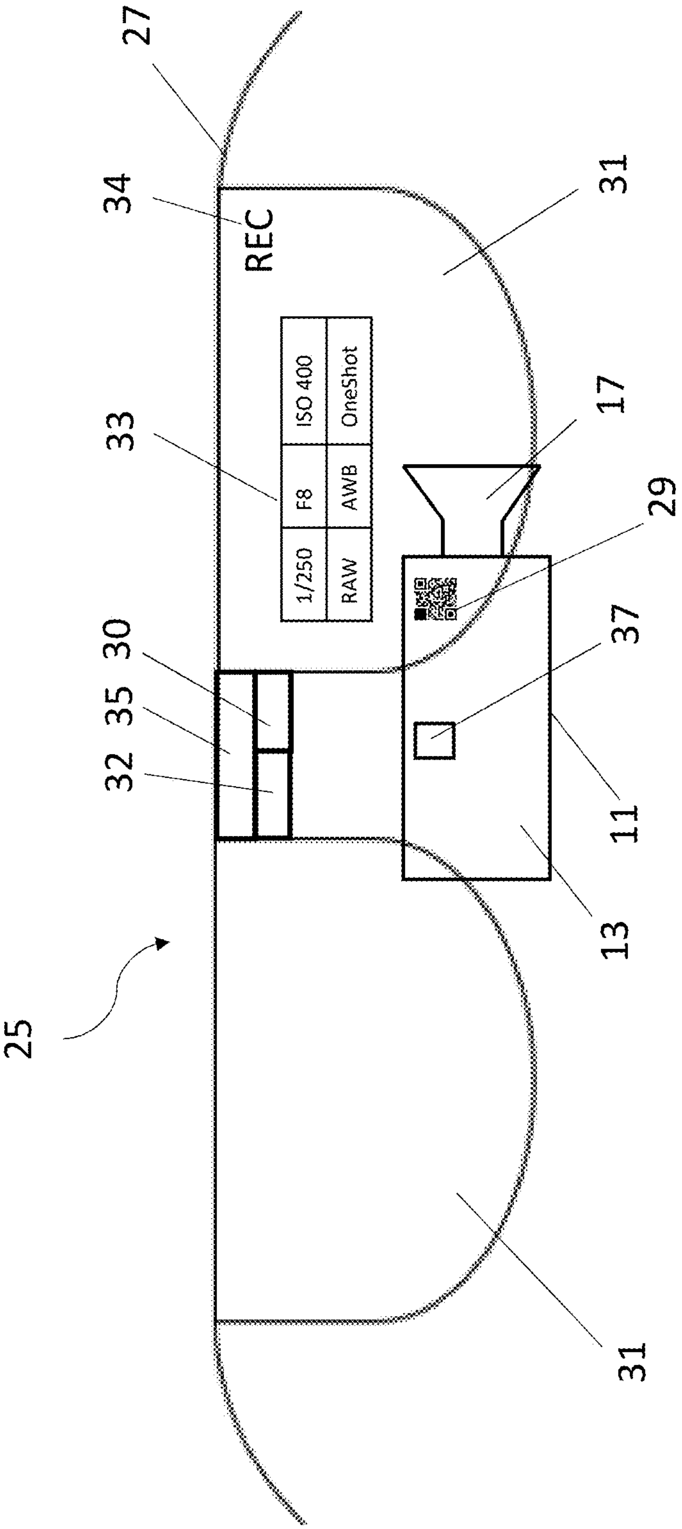
FIG. 3 a second embodiment of the motion picture camera system comprising the data glasses.

FIG. 3 shows a second embodiment of the motion picture camera system 25 comprising the data glasses 27 and the motion picture camera 11 that differs from the first embodiment of FIG. 2 in that a glasses detection sensor 37 installed in the camera housing 13 additionally detects the position and/or orientation of the data glasses 27 relative to the position and/or orientation of the motion picture camera 11. For this purpose, a QR code 29, not shown, is applied to the data glasses 27, for example to the glasses frame of the data glasses 27, such that the glasses detection sensor 37 may detect the QR code 29 and thus the position and/or orientation of the data glasses 27 relative to the motion picture camera 11. Corresponding signals are transmitted from the glasses detection sensor 37, for example via a radio interface of the motion picture camera 11 and the data input 32 of the data glasses 27, to the control device 30 of the data glasses 27. An advantage of this embodiment is that both position data of the camera detection sensor 35 and position data of the glasses detection sensor 37 may be used to determine the position relationship between the data glasses 27 and the motion picture camera 11, whereby a greater accuracy in the determination of the position relationship is achieved.

Figure 4:
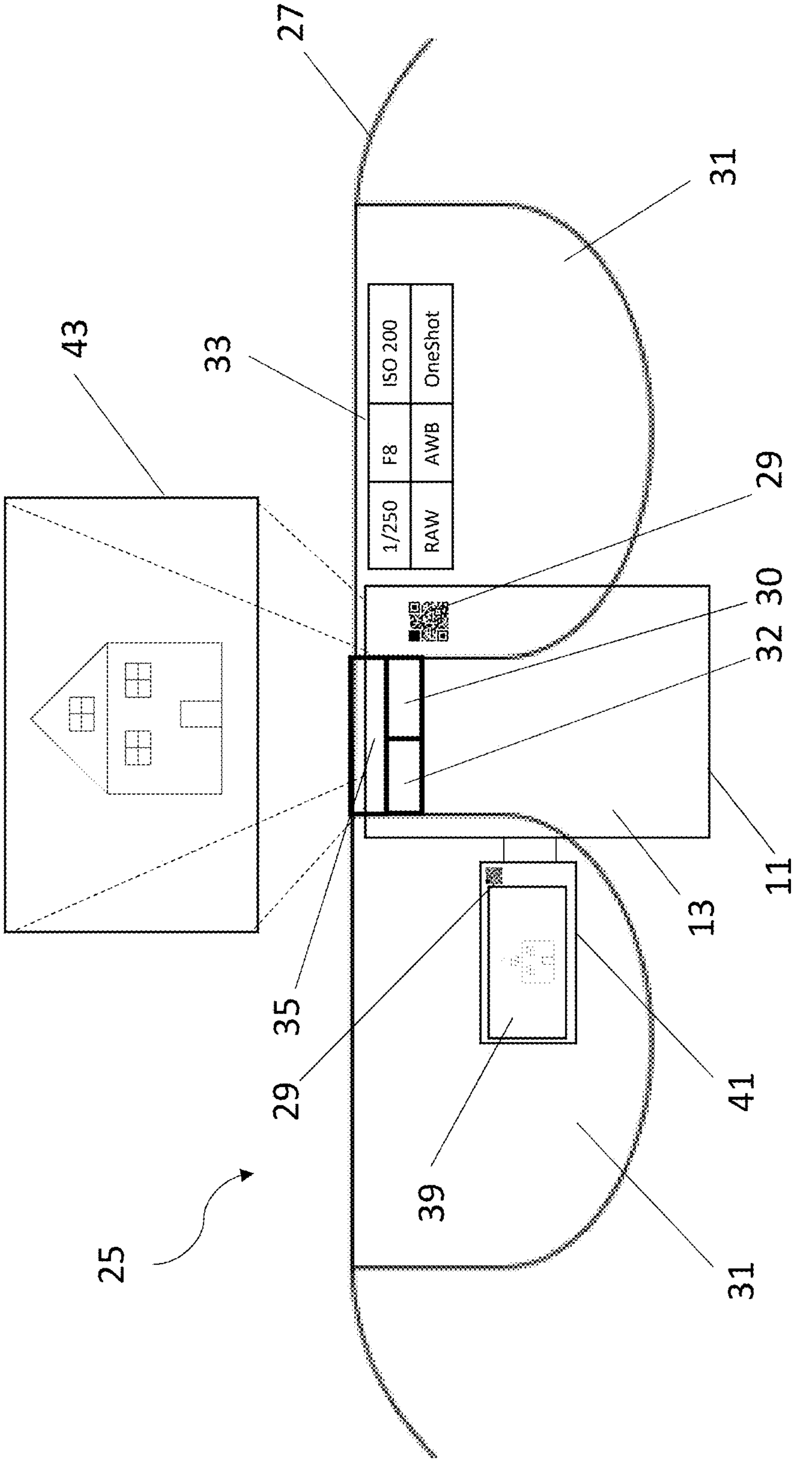
FIG. 4 a third embodiment of the motion picture camera system comprising the data glasses.

A third embodiment of the motion picture camera system 25 comprising the data glasses 27 and the motion picture camera 11 is shown in FIG. 4. FIG. 4 shows a rear view, i.e. a view of a side opposite the interchangeable lens 17, of the motion picture camera 11 at which a user of the data glasses 27 is looking. Two QR codes 29 are arranged at the motion picture camera 11 that are detected by the camera detection sensor 35 and used to determine the position relationship and to adjust the position of the representation of the received camera information at the display device 31. One of the two QR codes 29 is arranged at the camera housing 13, while the other QR code 29 is arranged at a projection surface 39 of an extension part 41. The extension part 41 may be fastened to the camera housing 13 in a fold-out or fold-in manner, or fastened to a viewfinder of the motion picture camera 11 in a fold-out or fold-in manner, as is known, for example, for a real display device from U.S. Pat. No. 9,854,173 B2. Based on the detected QR code 29 at the camera housing 13, as already shown in FIG. 2 and FIG. 3, a representation of the camera configuration information 33 is arranged in a region at the display device 31 in which the motion picture camera 11 is not arranged, but in a predetermined spatial relationship to the motion picture camera 11. The representation of the camera configuration information 33 is displayed in spatial proximity to the corresponding QR code 29. For example, the representation of the camera configuration information 33 may be displayed in a fixed spatial relationship to the corresponding QR code 29.

Furthermore, based on the detection of the QR code 29 on the projection surface 39 of the folded-out extension part 41, a representation of a recorded image 43 of the motion picture camera 11 is displayed at the display device 33 such that the representation of the recorded image 43 appears superposed on the projection surface 39 of the extension part 41. Thus, it appears to the user of the data glasses 27 as if the projection surface 39 is an actually installed (folded-out) display of the motion picture camera 11. The representation of the recorded image 43, which is superposed on the projection surface 39, thus represents a virtual display. The recorded image 43 of the motion picture camera 11 or the corresponding camera information may in turn be transmitted via a data output of the motion picture camera 11, for example by radio, to the data input 32 and thus to the control device 30 of the data glasses 27.

A projection surface 39 for a superposed display of a representation of camera information at the display device 31 of the data glasses 27 may generally also be arranged at the camera housing 13 itself. Furthermore, a projection surface may also be identified without a marking, such as a QR code 29. For example, free areas at the camera housing 13 and/or at additional components of the motion picture camera 11 may be detected solely based on the signals of the camera detection sensor 35 (e.g. an auxiliary camera with image recognition). For example, a free area may be used as the projection surface 39 if the free area has a predetermined minimum size. One advantage of using projection surfaces to create virtual displays is that the projection surfaces in question may be used flexibly and in a variety of ways. For example, the representation of the camera information, which is superposed on the projection surface 39, may be adapted or changed depending on the requirements and application.

Figure 5B:
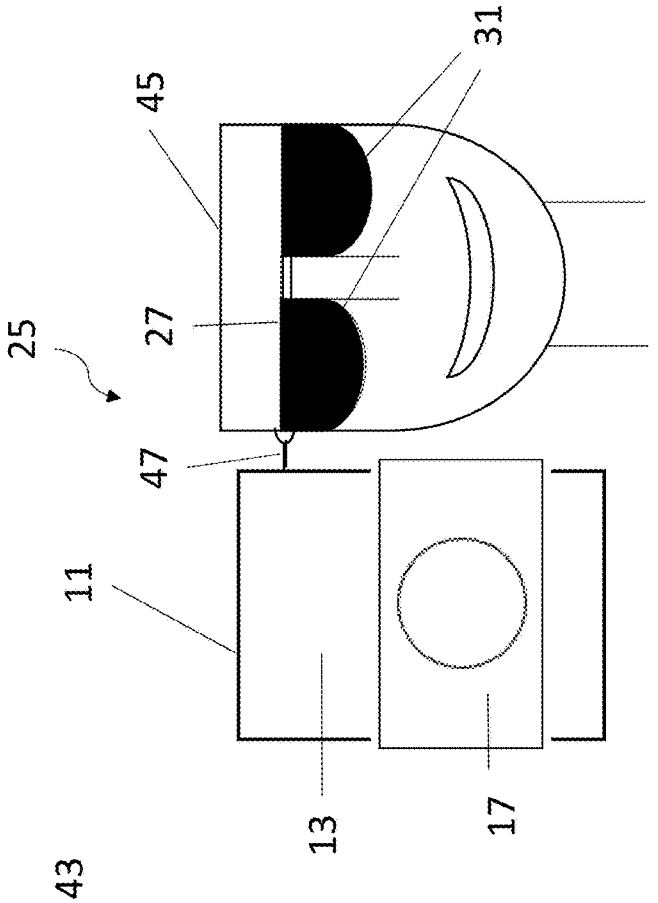
FIGS. 5A and 5B a fourth embodiment of the motion picture camera system comprising the data glasses.
Figure 5A:
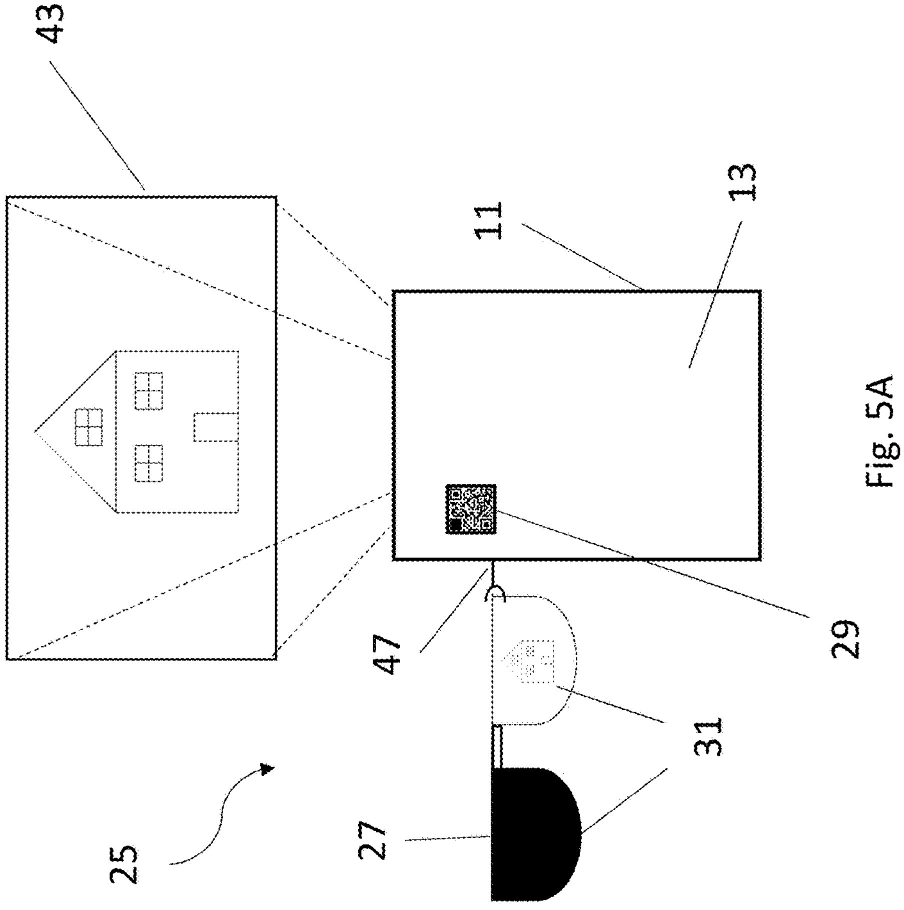

FIGS. 5A and 5B show a fourth embodiment of the motion picture camera system 25 comprising the data glasses 27 and the motion picture camera 11, wherein FIG. 5A shows a rear view of the motion picture camera 11 and FIG. 5B shows a corresponding front view of the motion picture camera. For the sake of simplicity, the control device 30, the data input 32 and the camera detection sensor 35 of the data glasses 27 are not shown here and the user 45 of the data glasses 27 is only shown in FIG. 5B.

In FIGS. 5A and 5B, the data glasses 27 are used by the user 45 in a viewfinder mode in which the control device controls the display device 31 to display a representation of a recorded image 43 of the motion picture camera 11, wherein, in the case of a recorded motion picture sequence, a sequence of recorded images 43 may be reproduced. The respective recorded image 43 is only displayed on a lens, which is adjacent to the camera housing 13, of the data glasses 27 or the display device 31. The other lens of the data glasses 27 is operated in a completely opaque state so that the amount of light of the light incident on the other eye is minimized. The recorded image 43 of the motion picture camera 11 is displayed via a first display layer (close to the user) of the displaying lens of the data glasses 27, while a second display layer (i.e. remote from the user) of the display device 31 located behind the first display layer along the direction of observation is switched completely opaque in the viewfinder mode for both lenses of the display device 31, as shown in FIG. 5B. The second display layer (remote from the user) may, for example, comprise a liquid crystal display.

In the viewfinder mode, a viewfinder function of a conventional motion picture camera is emulated in which a viewfinder is fastened to the camera housing. In the viewfinder mode of the data glasses 27, there should also be a geometric relationship between the head and the viewing angle of the user 45, on the one hand, and the recording axis of the motion picture camera 11 or the optical axis of the interchangeable lens 27, on the other hand, the interchangeable lens 27 of the motion picture camera 11 is perceived as an extension of one's own eye and the orientation and guidance of the motion picture camera 11 are hereby facilitated. For this purpose, the shape of the motion picture camera 11 and in particular of the camera housing 13 may be adapted to predefine a specific position and orientation of the head of the user 45 that is leaned against the motion picture camera 11. Furthermore, a frame 47 may be arranged (e.g. releasably fastened) at the motion picture camera 11 to predefine such a position and orientation of the head of the user 45 and/or the data glasses 27 in the viewfinder mode.

The viewfinder mode may be started automatically, for example, by contacting or otherwise coupling the data glasses 27 with or to the frame 47 of the motion picture camera 11. By means of a viewfinder mode selection sensor, not shown, a contact of the data glasses 27 with and/or a coupling of the data glasses 27 to the frame 47 of the motion picture camera 11 is recognized, whereupon the control device of the data glasses 27 starts the viewfinder mode. If the data glasses 27 are removed from the frame 47, the control device ends the viewfinder mode, wherein the data glasses 27 automatically switch to the observation mode. Due to the detectable contacting of the data glasses 27 with a predetermined contacting point of the motion picture camera 11 (such as the frame 47), the user 45 may establish an intuitive, geometric relationship between his head and the recording axis of the motion picture camera 11 in the viewfinder mode and may simultaneously trigger the viewfinder mode.

Figure 6A:
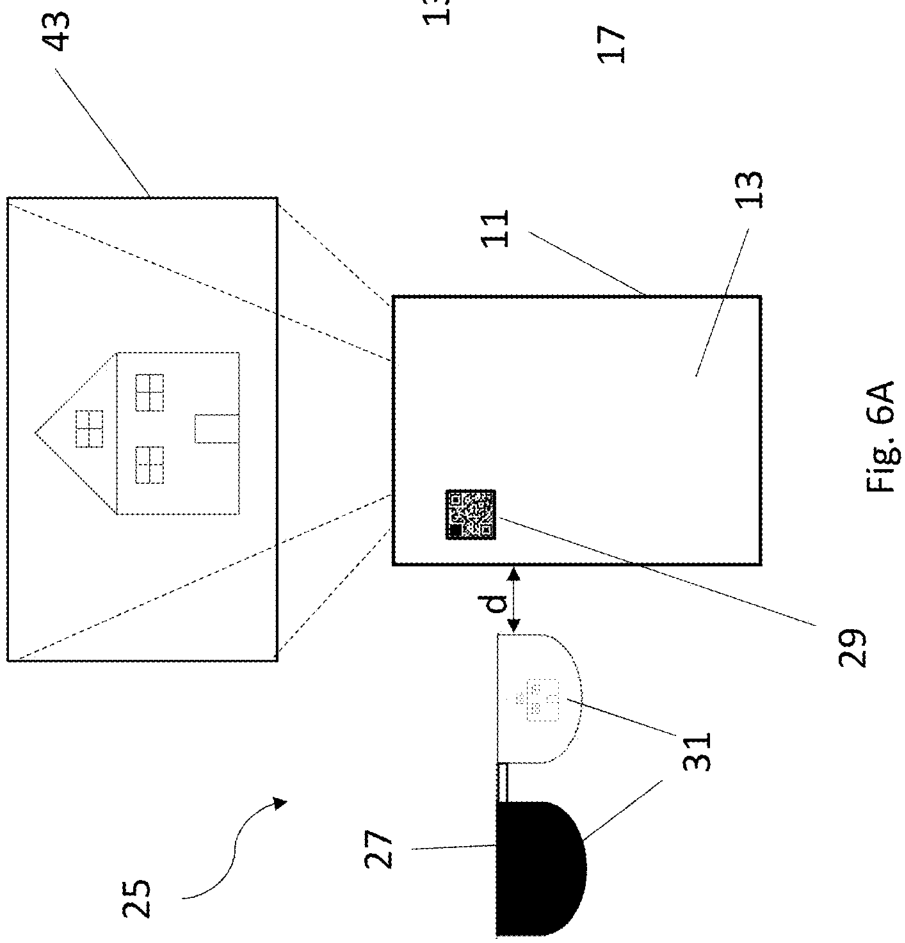
FIGS. 6A and 6B a fifth embodiment of the motion picture camera system comprising the data glasses.
Figure 6B:
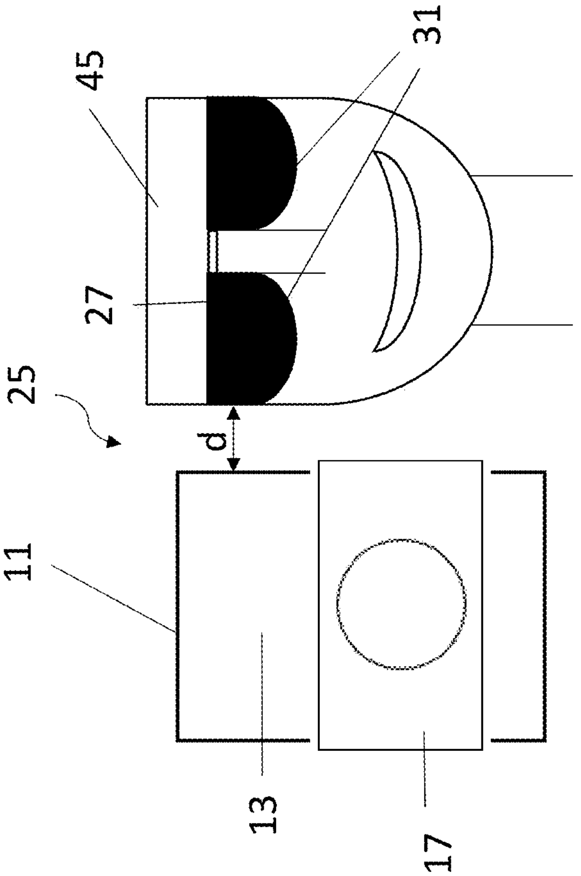

FIGS. 6A and 6B show a fifth embodiment of the motion picture camera system 25 comprising the data glasses 27 and the motion picture camera 11, wherein the data glasses 27 are operated in the viewfinder mode. Unlike the embodiment shown in FIGS. 5A and 5B, the activation of the viewfinder mode here takes place based on the approach of the data glasses 27 to the motion picture camera 11 into a predetermined minimum distance. The viewfinder mode is therefore started automatically as soon as the distance d between the data glasses 27 and the motion picture camera 11 reaches or falls below the predetermined minimum distance. Conversely, the viewfinder mode ends or the observation mode starts automatically when the distance d between the data glasses 27 and the motion picture camera 11 exceeds the predetermined minimum distance or a triggering distance that is greater than the minimum distance. The detection of the distance between the data glasses and the motion picture camera 11 in this respect takes place by means of said viewfinder mode selection sensor, not shown.

Figure 7:
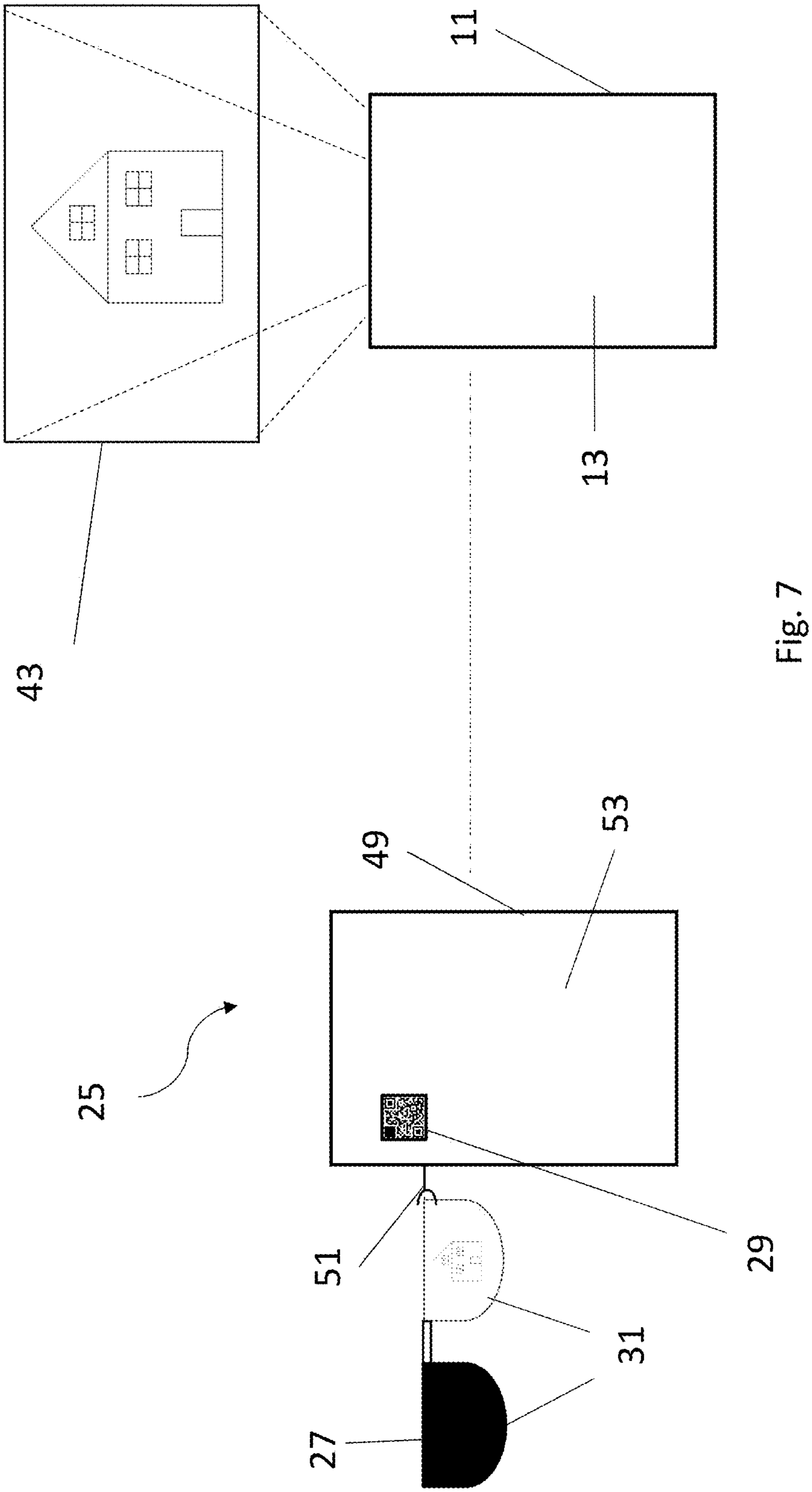
FIG. 7 a sixth embodiment of the motion picture camera system comprising the data glasses.

FIG. 7 shows a sixth embodiment of the motion picture camera system 25 comprising the data glasses 27, the motion picture camera 11 and a remote control unit 49, wherein the data glasses 27 are operated in the viewfinder mode. In such an embodiment, the control device of the data glasses 27 may be configured to selectively determine a further position relationship that indicates a position and/or orientation of the data glasses 27 relative to the remote control unit 49, wherein the control device adjusts the position of the representation of the received camera information (e.g. recorded images 43) at the display device 31 based on this further position relationship. One possible application may, for example, be that the motion picture camera 11 is arranged at a remote location, for example mounted at a crane, wherein the remote control unit 49 may also control the position and/or orientation of the motion picture camera 11 (via corresponding actuators at a holder of the motion picture camera 11). In such an application, the data glasses 27 may interact with the remote control unit 49, which in turn serves as an "extension" of the motion picture camera 11.

In contrast to the embodiments shown above, the motion picture camera 11, in accordance with FIG. 7, transmits the recorded image 43 or the data corresponding to the recorded image 43 to the remote control unit 49 that is in turn in communication with the data glasses 27, in particular via its data input. As already described above, in the viewfinder mode, the data glasses 27 display a representation of the recorded image 43 on at least one of the lenses of the display device 31. The representation of the camera information at the display device 43 of the data glasses 27 is set depending on the position relationship between the data glasses 27 and the remote control unit 49, i.e. depending on the position and/or orientation of the data glasses 27 relative to the position and/or orientation of the remote control unit 49.

In an embodiment according to FIG. 7, the viewfinder mode may also be started by contacting or approaching the data glasses 27 with or at the remote control unit 49 or a frame 51 of the remote control unit 49. As explained for the motion picture camera 11 according to FIGS. 5 A and 5 B, the shape of the remote control unit 49 may be adapted to predefine a specific position and orientation of the head of the user 45 that is leaned against the remote control unit 49. Furthermore, the frame 51 may be arranged (e.g. releasably fastened) at the remote control unit 49 to predefine such a position and orientation of the head of the user 45 and/or the data glasses 27 in the viewfinder mode.

A QR code 29 is applied to the housing 53 of the remote control unit as an optical marking and may be used to determine the position relationship between the data glasses 27 and the remote control unit 49.

The communication between the remote control unit 49 and the motion picture camera 11 takes place bidirectionally, i.e. the remote control unit 49 not only receives the data corresponding to the recorded image 43 from the motion picture camera 11, but also transmits control commands to the motion picture camera 11 that correspond to the guidance of the remote control unit 49 by the user 45 and, for example, comprise a tilting movement or a panning movement. Based on the control commands, the motion picture camera 11 may execute a movement corresponding to the guidance of the remote control unit 49 by means of actuators not shown, for example drive motors. Thus, the user 45 of the motion picture camera system 11 is able to control or remotely control the motion picture camera 11 by means of the data glasses 27 and the remote control unit 49 in a familiar manner, wherein the handling of a directly held motion picture camera 11 may be simulated.

In addition to the embodiments explained above, it should also be noted that the respective data glasses 27 may also receive camera information from a plurality of motion picture cameras 27 and display said camera information at the display device 31. Alternatively or additionally, a plurality of data glasses 27 may be provided that display different representations of the camera information received from the same motion picture camera 27 at the respective display device 31. When using a plurality of data glasses 27, each pair of data glasses may therefore be configured individually so that the different users simultaneously each perceive a representation of the camera information that is adapted to their individual needs, in particular on one and the same projection surface 39 of the motion picture camera 27.

REFERENCE NUMERAL LIST

11 motion picture camera
13 camera housing
15 lens mount
17 interchangeable lens
19 viewfinder
21 display
23 eyecup
25 motion picture camera system
27 data glasses
29 QR code
30 control device
31 display device
32 data input
33 camera configuration information
34 status information
35 camera detection sensor
37 glasses detection sensor
39 projection surface
41 extension part
43 recorded image
45 user
47 frame
49 remote control unit
51 frame at the remote control unit
53 housing of the remote control unit

The invention claimed is:

1. Data glasses for a motion picture camera, said data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, further comprising at least one camera detection sensor which detects at least one of the position or orientation of the data glasses relative to the motion picture camera, wherein the control device determines the position relationship based on signals of the at least one camera detection sensor.

2. Data glasses according to claim 1, wherein the at least one camera detection sensor has an auxiliary camera which detects at least one marking at a camera housing of the motion picture camera.

3. Data glasses according to claim 1, wherein the control device is configured to adapt the representation of the received camera information at the display device based on a distance between the data glasses and the motion picture camera.

4. Data glasses according to claim 1, wherein the control device is configured to further adjust the position of the representation of the received camera information at the display device based on a user input.

5. A method of displaying camera information, which comprises status information, configuration information and/or recorded images of at least one motion picture camera located in a real environment, by means of at least one pair of data glasses, comprising the steps:

determining a position relationship that indicates at least one of a position or an orientation of the at least one pair of data glasses relative to the at least one motion picture camera;

displaying a representation of the camera information at a display device of the at least one pair of data glasses based on the determined position relationship; and adjusting a position of the representation of the camera information at the display device such that the representation of the camera information appears to be arranged in a fixed position in space in relation to the at least one motion picture camera located in the real environment.

6. Data glasses for a motion picture camera, said data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, wherein the display device is transparent such that a real environment of the data glasses can be perceived through the display device at least adjacent to the representation of the received camera information, wherein the control device is configured to adjust the position of the representation of the received camera information at the display device such that the representation appears to be superposed on a camera housing of the motion picture camera located in the real environment.

7. Data glasses for a motion picture camera, said data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, wherein the display device can be selectively switched between a regionally transparent state, in which a real environment of the data glasses can be perceived through the display device, and a regionally opaque state, wherein the control device is configured to switch the display device at least partly opaque in a region that corresponds to the position of the representation of the received camera information and to switch the display device transparent in other regions.

8. Data glasses for a motion picture camera, said data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, wherein the data glasses are configured to selectively assume an observation mode or a viewfinder mode, wherein, in the observation mode, the display device is at least partly transparent such that a real environment of the data glasses can be perceived through the display device, wherein the control device controls the display device to display a representation of status information or configuration information of the motion picture camera; and wherein, in the viewfinder mode, the control device controls the display device to display a representation of recorded images of the motion picture camera.

9. Data glasses according to claim 8, wherein the control device is configured to assume the viewfinder mode based on a signal of a viewfinder mode selection switch or a viewfinder mode selection sensor, wherein the viewfinder mode selection sensor is configured to detect a contact between the data glasses and the motion picture camera and/or an approach of the data glasses to the motion picture camera into a predetermined minimum distance (d).

10. Data glasses for a motion picture camera, said data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, wherein the display device comprises a first display layer and a second display layer, wherein the first display layer is configured to display the representation of the received camera information, and wherein the second display layer can at least regionally be switched between a transparent state and an opaque state.

11. Data glasses for a motion picture camera, said data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, wherein the display device comprises a display layer and a partly transmitting mirror that is configured to reflect a representation of the received camera information, said representation being displayed by the display layer, into the field of view of a user of the data glasses.

12. Data glasses for a motion picture camera, said data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, further comprising an eye position sensor for determining a position of an eyeball of a user of the data glasses, wherein the control device is configured to adjust the position of the representation of the received camera information at the display device based on the determined position of the eyeball.

13. Data glasses for a motion picture camera, said data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, wherein the displayed representation of the received camera information comprises at least one of information on a recording mode of the motion picture camera, a shutter speed, a diaphragm aperture, an ISO sensitivity, a file format, white balance information or a recording type.

14. A motion picture camera system, comprising:

at least one motion picture camera having a camera body that has a camera housing, a lens mount for connecting an interchangeable lens and an electronic image sensor; and at least one pair of data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, wherein the motion picture camera system comprises a plurality of motion picture cameras, wherein the data glasses are configured to display a respective representation of the camera information received from the respective motion picture camera at the display device for each of the plurality of motion picture cameras.

15. A motion picture camera system, comprising:

at least one motion picture camera having a camera body that has a camera housing, a lens mount for connecting an interchangeable lens and an electronic image sensor; and at least one pair of data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, wherein the motion picture camera system comprises a plurality of data glasses, wherein the plurality of data glasses are configured to display different representations of the received camera information at the respective display device based on a respective preset data glasses configuration.

16. A motion picture camera system, comprising:

at least one motion picture camera having a camera body that has a camera housing, a lens mount for connecting an interchangeable lens and an electronic image sensor; and at least one pair of data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, wherein the motion picture camera system further comprises a remote control unit for a remote control of the at least one motion picture camera, wherein the control device of the data glasses is configured to selectively determine a further position relationship that indicates a position and/or orientation of the data glasses relative to the remote control unit, and to adjust the position of the representation of the received camera information at the display device based on the further position relationship.

17. A motion picture camera system, comprising:

at least one motion picture camera having a camera body that has a camera housing, a lens mount for connecting an interchangeable lens and an electronic image sensor; and at least one pair of data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, wherein the at least one motion picture camera has a glasses detection sensor that is configured to detect the position and/or orientation of the at least one pair of data glasses relative to the at least one motion picture camera, wherein the control device of the at least one pair of data glasses is configured to determine the position relationship based on signals of the glasses detection sensor.

18. A motion picture camera system, comprising:

at least one motion picture camera having a camera body that has a camera housing, a lens mount for connecting an interchangeable lens and an electronic image sensor; and at least one pair of data glasses comprising:

a data input which receives camera information comprising at least one of status information of the motion picture camera, configuration information of the motion picture camera or recorded images of the motion picture camera;

a display device which displays a representation of the received camera information; and a control device which determines a position relationship indicating at least one of a position or an orientation of the data glasses relative to the motion picture camera, and which adjusts a position of the representation of the received camera information at the display device based on the position relationship, wherein the camera housing of the at least one motion picture camera has at least one projection surface, wherein the control device of the at least one pair of data glasses is configured to adjust the position of the representation of the received camera information at the display device such that the representation appears superposed on the at least one projection surface of the camera housing.

19. A method of displaying camera information, which comprises status information, configuration information and/or recorded images of at least one motion picture camera located in a real environment, by means of at least one pair of data glasses, comprising the steps:

determining a position relationship that indicates at least one of a position or an orientation of the at least one pair of data glasses relative to the at least one motion picture camera;

displaying a representation of the camera information at a display device of the at least one pair of data glasses based on the determined position relationship; and adjusting a position of the representation of the camera information at the display device such that the representation of the camera information appears to be superposed on a camera housing of the at least one motion picture camera located in the real environment.

20. A method according to claim 19, wherein the representation of the camera information displayed at the display device of the at least one pair of data glasses comprises at least one of a shutter speed, a diaphragm aperture, an ISO sensitivity, a file format, white balance information or a recording type of the at least one motion picture camera.

* * * * *